United States Patent [19]
Rossiter

[11] 3,779,586
[45] Dec. 18, 1973

[54] HOSE COUPLING CONNECT AND DISCONNECT MECHANISM

[76] Inventor: Donald W. Rossiter, Moneta, Iowa 51352

[22] Filed: Aug. 10, 1972

[21] Appl. No.: 279,546

[52] U.S. Cl.................. 285/308, 285/277, 285/316
[51] Int. Cl............................................ F16l 37/00
[58] Field of Search.................... 285/311, 313, 314, 285/315, 316, 277, 33, 85, 87, 88, 18, 308

[56] References Cited
UNITED STATES PATENTS

| | | | |
|---|---|---|---|
| 736,057 | 8/1903 | Beatty | 285/311 |
| 755,249 | 3/1904 | Seals | 285/311 |
| 1,782,062 | 11/1930 | Erickson | 285/315 X |
| 3,298,715 | 1/1967 | Stehle | 285/277 X |

FOREIGN PATENTS OR APPLICATIONS

| | | | |
|---|---|---|---|
| 651,738 | 11/1962 | Canada | 285/277 |
| 1,164,369 | 10/1958 | France | 285/311 |
| 717,789 | 2/1942 | Germany | 285/311 |
| 749,795 | 5/1956 | Great Britain | 285/277 |

*Primary Examiner*—Dennis L. Taylor
*Attorney*—Zarley, McKee & Thomte

[57] ABSTRACT

A hydraulic hose coupling including telescopic male and female members having a slidable locking sleeve on the female member. An actuator for the locking sleeve is provided which includes a pair of semi-cylindrical clamping elements having ears on opposite sides to which a pair of oppositely disposed lever elements are pivoted. A pair of oppositely disposed link elements extend from the lever elements towards the coupling and are pivoted at their inner ends to stationary legs having their outer ends secured to the outer end of the female coupling member. The locking sleeve is spring biased towards the male member and inward pivoting of the lever elements causes the locking sleeve to move longitudinally away from the male member against the action of the spring thereby allowing the telescoping members to be separated.

10 Claims, 4 Drawing Figures

PATENTED DEC 18 1973 3,779,586
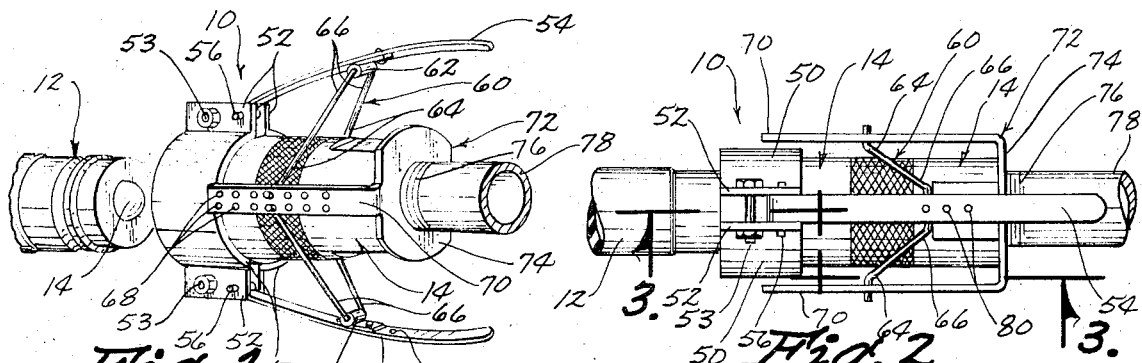
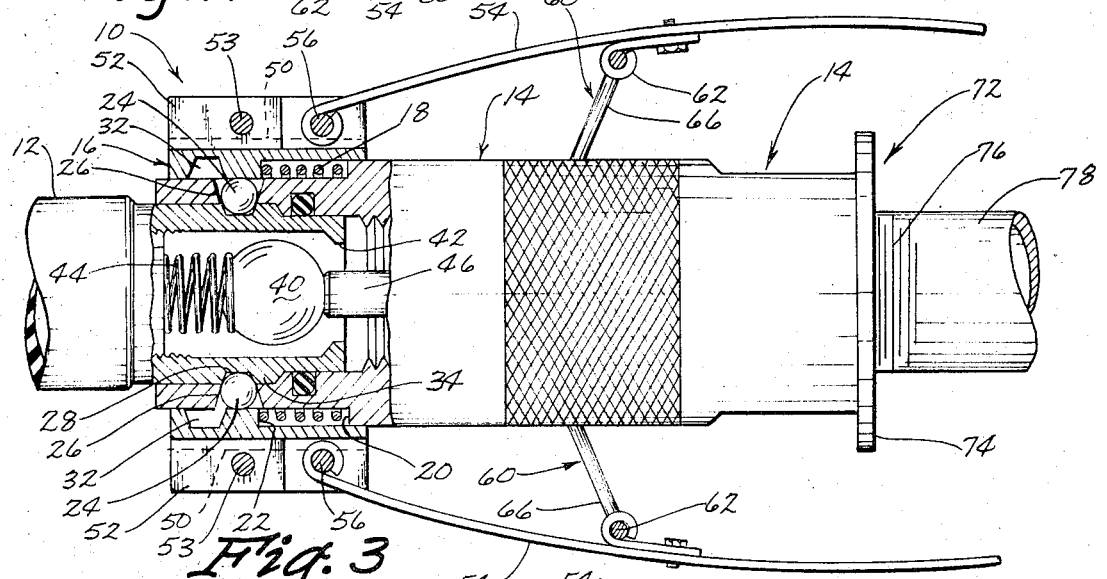
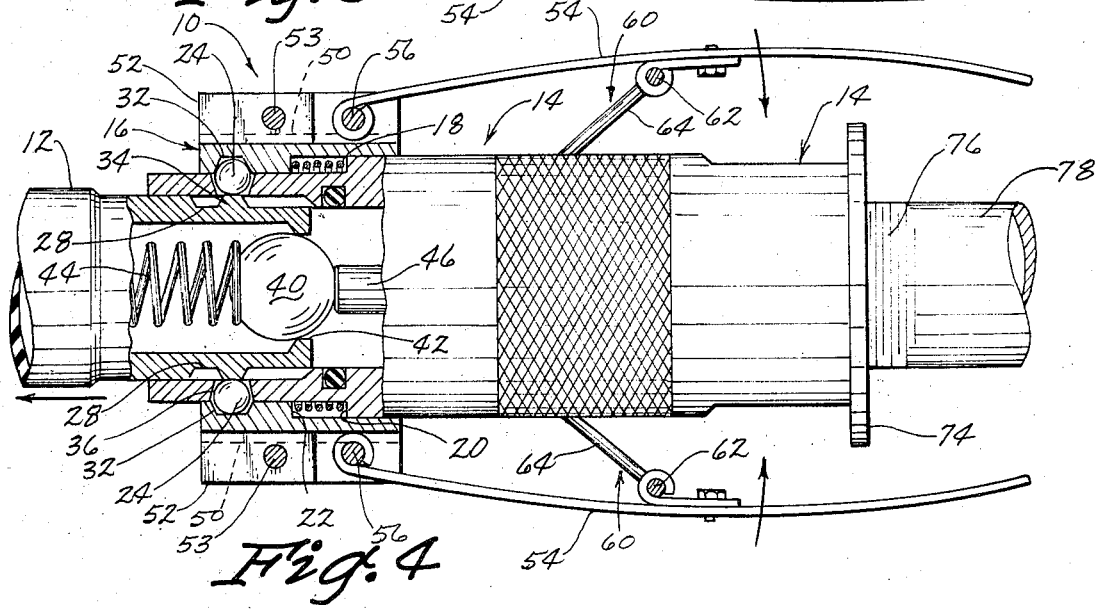

HOSE COUPLING CONNECT AND DISCONNECT MECHANISM

Ordinarily coupling and uncoupling hydraulic hoses on farm implements or the like requires the use of at least two hands. One hand is used to hold the female coupling member while the other hand is used to slide the locking sleeve outwardly from the male member against the action of the spring and a third hand, if available, is used to position the male member within the female member. Release of the locking sleeve allows the spring to move the locking sleeve towards the male member thereby locking the two members together.

The hose coupling connect and disconnect mechanism of this invention makes it possible to easily effect a connection between hydraulic male and female members by the actuator forming a part of the female member such that in grasping the lever elements of the actuator the female member is also being held for positioning relative to the male member. The squeezing of the lever elements causes the locking sleeve to move against the spring action whereby the male member may be inserted or removed. Thus only one hand is required for holding the female coupling member and moving the locking sleeve. If the male member is stationary as on the rear of a tractor, the coupling can be accomplished with the use of only one hand.

The actuator mechanism of this invention can be readily adapted to existing hydraulic couplings by simply clamping the semi-cylindrical half-sections onto the female coupling member through the use of two bolts. A pair of legs are also positioned on the hose of the female coupling member for the inner ends of pivotal lengths which are connected at their outer ends to the lever elements.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary perspective view of a hose coupling utilizing the connect and disconnect mechanism of this invention.

FIG. 2 is a top plan view showing the hoses being coupled.

FIG. 3 is a cross sectional view taken along line 3 — 3 in FIG. 2.

FIG. 4 is a view similar to FIG. 3 but showing the locking sleeve in its retracted unlocked position whereby the male element is free to be removed from the female coupling member.

The actuator mechanism of this invention is referred to generally in FIG. 1 by the reference numeral 10 and is shown on a coupling including a male member 12 and a female coupling member 14. A locking sleeve 16 is slidable on the female member 14 and is biased toward the male member 12 by a spring 18 positioned between shoulders 20 and 22. A ball detent 24 is positioned in a notch 26 in the female member 14 which registers with a notch 28 in the male member 12. A shoulder 30 engages the outer edge of the ball 24 to maintain it in the notches 26 and 28 when the coupling members are engaged and locked together. A notch 32 in the locking sleeve 16 is positioned to register with the ball 24 when the locking sleeve is moved away from the male member 12 thereby allowing the ball to move out of the notch 28 in the male member whereby the male member may be disconnected from the female coupling member 14 as seen in FIG. 4. A shoulder 34 on the male member maintains the ball 24 in the notch 26 and notch 32 when the locking sleeve 16 has moved away from the male member 12.

The hydraulic male coupling member 12 is ordinarily connected to a hydraulic pressure source and a normally closed ball 40 is biased against a seat 42 by a spring 44 only being displaced from the seat 42 by a pin 46 carried inside the female coupling member 14 when the male and female members are telescopically locked together as seen in FIG. 3.

The actuator 10 includes a pair of semi-cylindrical clamp elements 50 having transversely outwardly extending ear portions 52 locked together by bolts 54 in spaced apart relationship. A pair of oppositely disposed longitudinally extending lever elements 54 are pivoted at their inner ends between the adjacent ears 52 by a pin 56. The body of the lever elements 54 are curved or contoured to fit the operator's hand and extend along the body of the female coupling member 14. Intermediate the ends of the lever elements 54 a U-shaped link element 60 is pivotally connected to a sleeve 62 carried on the underside of the link element whereby the legs 64 extend toward the male member 12 on opposite sides of the female member 14 where their inner ends 66 are pivoted in openings 68 in stationary legs 70 carried on a bracket 72 having a center portion 74 threaded onto thread 76 on the hose 78 connected to the female coupling member 14. The openings 68 include two rows of openings in the leg 70 to accommodate the inner ends 66 of the link elements 60. The sleeve 62 is adjustably positioned along the length of the lever elements 54 by a series of longitudinally positioned openings 80 being provided in the lever elements 54.

Thus it is seen in operation that a conventional hydraulic hose coupling is suited for mounting the actuator of this invention thereon. The half clamp sections semi-cylindrical in shape are mounted on the locking sleeve 16 by the bolts 54 being tightened thereto. The links 60 are adjusted by positioning the inner ends in the appropriate openings 68 in the stationary bracket 72 while the outer ends of the links are positioned by selecting the appropriate hole 80 in the levers 54. The bracket 72 is held on the coupling by being screwed up tight to the female member 14 utilizing the threads on the hose 78. Upon the actuator mechanism being installed on the female coupling member 14 the locking sleeve is moved to the position of FIG. 4 by the operator's hand grasping the female coupling member through the lever elements 54 which are squeezed together thereby causing the locking sleeve 16 to move longitudinally away from the male coupling member 12 which in turn allows the male member to be inserted into the female member and upon the lever elements being released the locking sleeve 16 moves back under pressure from the spring 18 to its normal position of FIG. 3 whereby the coupling is completed. Upon disconnecting the coupling the procedure is repeated wherein the levers 54 are squeezed together and the locking sleeve is moved again away from the male member 12 allowing the male member to be withdrawn from the female coupling member 14. Again the lever elements 54 may be released allowing the sleeve to return to its normal position. If desired, the ears 52 on the clamp elements may be made integral with the locking sleeve as, for example, in the case of the actuator being built into the coupling rather than being added as an optional item at a later date.

I claim:

1. An actuator for a hose coupling including male and female members adapted to be telescopically locked together by an outer locking sleeve being longitudinally slidable, said actuator comprising, a clamp means adapted to be secured to a locking sleeve, a pair of oppositely disposed longitudinally extending lever elements pivotally connected at one end to opposite sides of said clamp means, a link element pivotally connected to each of said lever elements outwardly of said clamp means and extending angularly towards said clamp means, and stationary means being provided to which the inner ends of said link elements are pivoted whereby as said lever elements are pivoted toward each other said clamp means is moved longitudinally outwardly.

2. The structure of claim 1 wherein said clamp means includes a pair of semi-cylindrical elements having outwardly extending ears through which bolt means extend for locking said elements to a locking sleeve and to which said lever elements are pivoted.

3. The structure of claim 1 wherein said stationary means includes a U-shaped element having oppositely disposed legs to which said link elements are pivoted, and the base of said U-shaped element is adapted to engage the outer end of said female member.

4. The structure of claim 3 wherein said legs have a series of longitudinally spaced apart openings for selectively receiving the inner ends of said link elements.

5. The structure of claim 4 wherein the outer ends of said link elements are selectively adjustable along said lever elements.

6. The structure of claim 4 wherein each of said link elements includes a pair of side portions extending in spaced relation from said lever elements for positioning on opposite sides of a coupling and said opposite side portions of each link element pivotally engaging the adjacent leg of said stationary means.

7. A hose coupling including male and female members adapted to be telescopically locked together by an outer locking sleeve being longitudinally slidable, an actuator for said outer locking sleeve comprising, a pair of oppositely transversely extending ears on said locking sleeve, a pair of oppositely disposed longitudinally extending lever elements pivotally connected at one end to said pair of ears, a link element pivotally connected to each of said lever elements outwardly of said ears and extending angularly toward said locking sleeve, and stationary means on said coupling to which the inner ends of said link elements are pivoted whereby as said lever elements are pivoted towards each other said collar is moved longitudinally outwardly away from said male member to release said male member.

8. The structure of claim 7 wherein said link elements include oppositely disposed side portions extending on opposite sides of said coupling, and said stationary means includes oppositely disposed legs to which adjacent side portions of said links are pivoted.

9. The structure of claim 7 wherein said ears are further defined as being the outer oppositely extending ends of semi-cylindrical clamp elements matingly engaging said female coupling member.

10. The structure of claim 7 wherein said outer locking sleeve is spring biased towards said male member whereby said lever elements are normally pivoted outwardly from said locking sleeve.

* * * * *